United States Patent
Balebail (10) Patent No.: US 8,661,024 B2
(45) Date of Patent: Feb. 25, 2014

(54) DATABASE QUERY RESOURCE MANAGEMENT USING SELECT STATEMENT CONDITION

(75) Inventor: Vijay Balebail, Allen, TX (US)

(73) Assignee: Oracle International Corporation, Redwood Shores, CA (US)

( * ) Notice: Subject to any disclaimer, the term of this patent is extended or adjusted under 35 U.S.C. 154(b) by 377 days.

(21) Appl. No.: 12/691,701

(22) Filed: Jan. 21, 2010

(65) Prior Publication Data

US 2011/0179015 A1   Jul. 21, 2011

(51) Int. Cl.
*G06F 7/00* (2006.01)
*G06F 17/30* (2006.01)

(52) U.S. Cl.
USPC .......................................................... 707/720

(58) Field of Classification Search
USPC .......................................................... 707/720
See application file for complete search history.

(56) References Cited

U.S. PATENT DOCUMENTS

| | | | |
|---|---|---|---|
| 5,857,190 A * | 1/1999 | Brown | 1/1 |
| 6,745,221 B1 * | 6/2004 | Ronca | 718/104 |
| 7,127,456 B1 * | 10/2006 | Brown et al. | 1/1 |
| 7,454,404 B2 * | 11/2008 | Dettinger et al. | 1/1 |
| 7,657,501 B1 * | 2/2010 | Brown et al. | 707/999.002 |
| 7,680,771 B2 * | 3/2010 | Cialini et al. | 707/999.003 |
| 7,752,219 B2 * | 7/2010 | Tasser et al. | 707/765 |
| 2002/0169907 A1 * | 11/2002 | Candea et al. | 710/220 |
| 2005/0081210 A1 * | 4/2005 | Day et al. | 718/104 |
| 2006/0074970 A1 * | 4/2006 | Narayanan et al. | 707/102 |
| 2006/0140115 A1 * | 6/2006 | Timus et al. | 370/230 |
| 2007/0022133 A1 * | 1/2007 | Barghouthi | 707/102 |
| 2007/0240126 A1 * | 10/2007 | Allen | 717/130 |
| 2008/0133456 A1 * | 6/2008 | Richards et al. | 707/2 |
| 2008/0209428 A1 * | 8/2008 | Baryshnikov et al. | 718/104 |
| 2008/0313207 A1 * | 12/2008 | Modad et al. | 707/102 |
| 2009/0007125 A1 * | 1/2009 | Barsness et al. | 718/104 |
| 2009/0024563 A1 * | 1/2009 | Sengar | 707/2 |
| 2009/0049024 A1 * | 2/2009 | Brown et al. | 707/4 |
| 2009/0106321 A1 * | 4/2009 | Das et al. | 707/200 |
| 2009/0132611 A1 * | 5/2009 | Brown et al. | 707/203 |
| 2009/0248764 A1 * | 10/2009 | Day et al. | 707/205 |
| 2010/0169489 A1 * | 7/2010 | Akiyama et al. | 709/226 |
| 2010/0325097 A1 * | 12/2010 | Er et al. | 707/702 |

OTHER PUBLICATIONS

Jellema, Lucas; XML Fundamentals—Select Trigger in Oracle Database—Introducing Fine Grained Auditing; obtained at http://technology.amis.nl/blog/810/select-trigger-in-oracle-database-introducing-fine-grained-auditing; 9 pages; Aug. 12, 2009.

* cited by examiner

*Primary Examiner* — Jeffrey A Burke
(74) *Attorney, Agent, or Firm* — Trellis IP Law Group, PC (57) ABSTRACT

A resource allocation system for a database environment. In a specific embodiment, the resource allocation system is adapted to implement a method that includes receiving a first signal from a user input device to identify a SQL SELECT statement to be used in a future database query. The system receives a second signal from the user input device to determine a resource to be used when the SELECT statement is executed. The system then stores, in a storage device, an indication of the resource in association with the SELECT statement so that when the SELECT statement is executed the resource is used.

18 Claims, 5 Drawing Sheets

DATABASE QUERY RESOURCE MANAGEMENT USING SELECT STATEMENT CONDITION

BACKGROUND

Databases are employed in various demanding applications, including Customer Relationship Management (CRM), search engines, corporate billing applications, and so on. Desired database performance characteristics may depend upon how computing resources are allocated to given tasks. In general, it is desirable to improve the speed or efficiency of a database search or query.

A database may be any collection of data. Computing resources may be any devices or mechanisms used to perform a computation or task involving one or more software or hardware instructions. Examples of computing resources include central processing unit (CPU) time or cycles allotted to a given computing task, memory such as disc storage space or Random Access Memory (RAM), network bandwidth or transfer mechanisms, etc.

Resource management is particularly important in database computing environments that include substantial amounts of old, rarely used data, in addition to recent and/or frequently used data. To facilitate managing data-storage resources, tools, products such as Oracle's Information Management Lifecycle (ILM) software and/or Oracle's Automatic Storage Management (ASM) may be employed. Such applications may facilitate organizing and separating relatively recent data from older, rarely used, accessed, or modified data. Data management policies may be assigned to different groups of data.

SUMMARY

An example resource allocation system includes a user interface that is adapted to receive input corresponding to a database query; a database; a database server in communication with the database and the user interface; functionality such as hardware and/or program code in a first module adapted to monitor one or more characteristics of the database query and provide a signal in response thereto; and second functionality such as hardware and/or program code in second module adapted to automatically selectively adjust computing resources used by the query statement based on the signal.

In a more specific embodiment, the resource allocation system is adapted to receive a signal from a user input device to identify a SQL SELECT statement to be used in a future database query; receive a signal from the user input device to determine a resource to be used when the SELECT statement is executed; and store in the storage device an indication of the resource in association with the SELECT statement so that when the SELECT statement is executed the resource is used.

Certain embodiments disclosed herein may facilitate preventing ad-hoc queries from accessing historical data or using CPU and/or I/O resources to prevent reduction in overall data base performance. Furthermore, embodiments disclosed herein may be particularly useful in applications where older data is not in a partitioned table, and where it is not possible to move data to less expensive archival discs. Furthermore, in packaged applications where a database administrator does not wish to manually archive data to slower or more cost effective discs or other hardware, certain embodiments disclosed herein are particularly desirable. In addition, in database environments, such as Oracle DBMachine, where use of different disk groups spanning beyond the exadata cells is prohibitive, and where storage of historical data in expensive cells is impractical, certain embodiments disclosed herein are particularly useful for facilitating resource management. Furthermore, in environments where disk space is considered inexpensive, and where all the data in the database resides in a single disk group, certain embodiments disclosed herein provide an alternative mechanism for resource management.

A further understanding of the nature and the advantages of particular embodiments disclosed herein may be realized by reference of the remaining portions of the specification and the attached drawings.

DETAILED DESCRIPTION OF EMBODIMENTS

Although the description has been described with respect to particular embodiments thereof, these particular embodiments are merely illustrative, and not restrictive.

While the present application is discussed with respect to allocating computing resources, such as Central Processing Unit (CPU) time and/or IO request queues to be processed by data subsystem. for execution of a Data Manipulation Language statement (DML), such as an Structured Query Language (SQL) query statement, based on analysis of contents of the statement, such as the contents of a SQL WHERE clause, embodiments are not limited thereto. For example, computer executable statements or instructions other than DML statements may be allocated computing resources in accordance with the present teachings without departing from the scope thereof.

For clarity, certain well-known components, such as hard drives, processors, operating systems, power supplies, and so on, have been omitted from the figures. However, those skilled in the art with access to the present teachings will know which components to implement and how to implement them to meet the needs of a given application.

Figure 1:
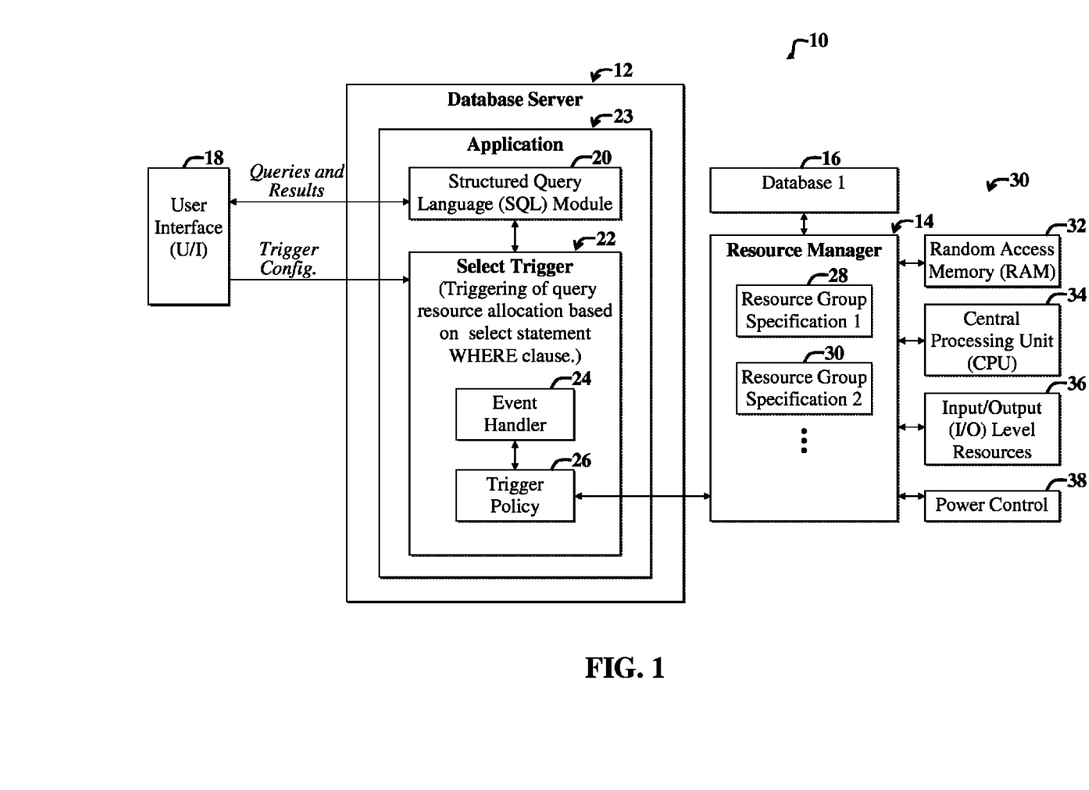
FIG. 1 is a diagram illustrating a first example embodiment of a system for selectively allocating computing resources for execution of a database query.

FIG. 1 is a diagram illustrating a first example embodiment of a system 10 for selectively allocating computing resources 30 for execution of a database query defined by a query statement.

For the purposes of the present discussion, a statement, such as a SQL statement, may be any instruction implemented in computer code or machine-readable syntax. A statement typically represents a specific instruction and may be included among a group of instructions comprising a given software application or module. A SQL statement is considered a type of DML statement. For the purposes of the present discussion, a DML may be any language or specification of computer readable instructions that may be used to access, modify, and/or add or delete data in a database. Note that this definition departs from the notion that a DML is restricted to languages that are used to modify, add, or delete data in a database, since a DML as defined herein may further include a language or computer readable syntax used only to access data. A DML statement, such as a SQL query statement, may be any computer-readable instruction adapted to access data in a database and/or to select, modify, delete, insert, or perform other input/output operations on a database.

The example system 10 includes a database server 10 in communication with a resource manager 14, which is coupled to a database 16. The resource manager 14 is adapted to control allocation of various computing resources 30 to a given database task, such as execution of a SQL query statement. A user interface 18, which includes a user input device, such as a keyboard and/or mouse, and a display device, such as a computer monitor, is coupled to the database server 12. The user interface 18 allows user access to and use of an application 14 running on the server 12. Note that while various modules 12, 16, 18 are shown in separate blocks, the various modules may be implemented in a single block, such as the database 16, without departing from the scope of the present teachings.

For illustrative purposes, the application 14 is shown including a SQL module 20 coupled to a select trigger 22. The SQL module 20 includes requisite computer code for supporting execution of SQL statements. For the purposes of the present discussion, a module may be any grouping of functionality, such as a set of computer-readable instructions. The functionality need not be physically co-located and may be implemented in hardware and/or software.

SQL statements may be entered by or otherwise initiated via the user interface 18. SQL statements may be used to access, select, insert, modify, delete, etc., data in the database 16. The application 14 may include additional functionality other than that shown by the constituent modules 20, 22. For example, the SQL module 20 and the select trigger 22 may be implemented in or via various applications, such as Oracle's Information Management Lifecycle (IML), Automatic Storage Management (ASM), and so on. Applications, such as Virtual Private Database (VPD) Application Programming Interface (API), and/or Oracle's Fine Grain Auditing software may be employed by those skilled in the art to implement the select trigger 22 without undue experimentation.

The select trigger 22 communicates with the SQL module 20 and the resource manager 14. In the present specific embodiment, database queries and other I/O database operations initiated via the database server 12 and user interface 18 are shown routed through a resource manager 23. However, functionality of the resource manager 23 may instead be distributed among other modules, such as the application 14, database 16, or via an underlying operating system.

For illustrative purposes, the resource manager 23 is shown including a first resource group specification 28 and a second resource group specification 30. Each group specification 28, 20 includes instructions specifying which resources are to be used by a query statement associated with or assigned to that specific group specification. For example, the first resource group specification 28 may limit CPU time allocated to execute a query associated with or assigned to that group specification.

The select trigger 22 includes computer code, also called instructions, for monitoring SQL query statements and triggering a particular resource-management policy based on one or more predetermined conditions, also called criteria. In a specific implementation, the select trigger 22 employs information in a SQL WHERE clause and compares the information to the predetermined condition. An example condition includes an indication in the WHERE clause that data being queried was entered in the database over two years ago or that the data being queried has not been used for 1 year. For the purposes of the present discussion, a SQL WHERE clause may be any portion of a SQL query statement occurring after the word WHERE. A SELECT statement may be any computer language construct defining or partially defining a query. A query may be any request for information or access to data, e.g., from a database. A SQL query statement typically includes a WHERE clause specifying what data to select from a database. For some queries, and indication of the age of the data being accessed may readily be determined with reference to the WHERE clause. The select trigger 22 facilitates associating resources with a given SELECT statement based on whether the contents of the WHERE clause meet one or more desired conditions, i.e., criteria.

The select trigger 22 includes an event handler 24 in communication with a trigger policy 26. The event handler 24 may include computer code, also called instructions, for identifying or indicating results derived from activation of the trigger policy 26. The trigger policy 26 may include instructions for determining if a given SQL query statement includes a WHERE clause meeting a predetermined condition and then associating a resource management policy to the query statement.

In the previous example, wherein the data being accessed is over two years old and has not been accessed within a year, the trigger policy 26 may identify and/or assign a resource management policy to the associated query statement, where the policy limits CPU allocation time for implementation of the query. For example, the select trigger 22 may associate a query statement with the first resource group specification 28 in the resource manager 28. Another example policy might specify that the query statement must wait for execution if other query statements are currently being executed or waiting for execution.

Any combination of the example computing resources 32-38 or portions thereof may be selectively allocated for execution of a given SQL query statement when the WHERE clause thereof meets a desired condition as determined by the select trigger 22. For example, a given SQL query statement may be allocated less RAM 32 for a given task and may be relegated to use a specific I/O level resource or group thereof.

In an example operative scenario, a user employs the user interface 18 to configure the select trigger 22 to trigger upon certain SQL query statements as desired. The user may specify any trigger criteria or conditions, such as conditions pertaining to the age of the data being accessed, and so on. The conditions may be maintained via the trigger policy module 26.

In the present example, the user then enters a SQL query by entering a SQL SELECT statement, also called a query statement, where the statement specifies data to be retrieved from the database 16. If the SQL query statement contains a WHERE clause meeting the predetermined criteria or conditions, then the trigger policy 26 is said to be fired. When fired, the trigger policy 26 triggers allocation of resources, via the resource manager 14, for execution of the SQL query statement. Upon execution of the SQL query statement, the event handler 24 may return an indication to the user interface 18 indicating how the SQL query statement was handled, what resources where used, what percentage of resources were used, and so on. The exact behavior of the event handler 24 and the trigger policy 26 are application specific. For example, the event handler 24 need not return all information pertaining to how a given SQL query was executed.

An example method that may be implemented by the system 10 includes monitoring one or more statements used to access or modify data in a database; determining when a monitored statement includes a clause meeting a predetermined criterion and providing a signal in response thereto;

and selectively allocating computing resources to implement the statement in response to the signal.

In an example implementation where the select trigger is implemented via Oracle Fine Grain Auditing with conditional auditing and using dynamic resources policy management, the select trigger determines if rows to be returned from a query statement satisfy a column condition. If the column condition is satisfied, then the query statement is executed via a default resource management group specification. Otherwise, the query statement is executed via an Oracle Information Management Lifecycle resource management specification, i.e., configuration.

Example computer code for executing this example implementation is shown in Table I, below:

```
BEGIN TABLE I
// Step 1: create 2 resource groups. One for Production high priority and the other low
priority.
exec dbms_resource_manager.create_pending_area;
-- create two consumer groups: PRIORITY_GROUP and HISTORICAL_GROUP
exec dbms_resource_manager.create_consumer_group('PRIORITY_GROUP', 'Those
that want immediate result');
exec dbms_resource_manager.create_consumer_group('HISTORICAL_GROUP', 'Those
that want to access historical data');
-- Create resource plan
-- priority group has top priority
-- any unused resources in shared between historical_group other group
-- in a 4/96 ratio.
exec dbms_resource_manager.create_plan('ILM_PLAN','Demo Resource Plan');
-- create plan directives
exec dbms_resource_manager.create_plan_directive(plan=>'ILM_PLAN',
group_or_subplan=>'PRIORITY_GROUP', comment=>'Can Grab All The CPU',
mgmt_p1=>100);
exec dbms_resource_manager.create_plan_directive(plan=>'ILM_PLAN',
group_or_subplan=>'HISTORICAL_GROUP', comment=>'Low priority for historical
data', mgmt_p2=>4);
exec dbms_resource_manager.create_plan_directive(plan=>'ILM_PLAN',
group_or_subplan=>'OTHER_GROUPS', comment=>' other activities at level 2',
mgmt_p2=>96);
exec dbms_resource_manager.validate_pending_area;
-- submit the pending area
exec dbms_resource_manager.submit_pending_area;
-- map session to consumer group
-- same session is mapped to multiple consumer groups.
exec dbms_resource_manager.create_pending_area;
exec dbms_resource_manager.set_consumer_group_mapping(attribute =>
DBMS_RESOURCE_MANAGER.ORACLE_USER, value =>
'SCOTT',consumer_group=>'PRIORITY_GROUP');
exec dbms_resource_manager.set_consumer_group_mapping(attribute =>
DBMS_RESOURCE_MANAGER.ORACLE_USER, value =>
'SCOTT',consumer_group=>'HISTORICAL_GROUP');
exec dbms_resource_manager.submit_pending_area;
--grants with consumer group
    exec dbms_resource_manager_privs.grant_switch_consumer_group(
grantee_name=>'SCOTT', consumer_group=>'HISTORICAL_GROUP',
grant_option=>FALSE);
    exec dbms_resource_manager_privs.grant_switch_consumer_group(
grantee_name=>'SCOTT', consumer_group=>'PRIORITY_GROUP',
grant_option=>FALSE);
    -- set initial consumer group
    exec dbms_resource_manager.set_initial_consumer_group(user => 'SCOTT',
consumer_group=>'HISTORICAL_GROUP');
    exec dbms_resource_manager.set_initial_consumer_group(user => 'SCOTT',
consumer_group=>'PRIORITY_GROUP');
    -- enable the plan
    ALTER SYSTEM SET resource_manager_plan = ILM_PLAN;
// Step 2: Create a fine grain audit with columnar condition on which we need to switch
the consumer group.
-- Create a table that will capture all the SQL statements that will triggers the condition
-- Create the procedure that is called by the select trigger.
create or replace
package AUDIT_HANDLER
is
PROCEDURE HANDLE_EMP_SAL_ACCESS
( object_schema VARCHAR2
, object_name VARCHAR2
, policy_name VARCHAR2
);
end;
/
create or replace package body AUDIT_HANDLER
is
PROCEDURE HANDLE_EMP_SAL_ACCESS
( object_schema VARCHAR2
, object_name VARCHAR2
```

-continued

```
, policy_name VARCHAR2
) is
    PRAGMA AUTONOMOUS_TRANSACTION;
begin
    -- Switch the RM for the session
    DBMS_RESOURCE_MANAGER.switch_consumer_group_for_sess
        (dbms_debug_jdwp.current_session_id ,
        dbms_debug_jdwp.current_session_serial,'HISTORICAL_GROUP');
end HANDLE_EMP_SAL_ACCESS;
end;
-- Add policy with the condition
begin
    dbms_fga.add_policy
    ( object_schema=>'SCOTT'
    , object_name=>'EMP'
    , policy_name=>'SAL_ACCESS_HANDLED'
    , audit_column => 'HIREDATE'
    , audit_condition => 'HIRDATE >= (sysdate-365)'
    , handler_schema => 'SCOTT'
    , handler_module => 'AUDIT_HANDLER.HANDLE_EMP_SAL_ACCESS'
    );
end;
/
END TABLE I
```

Figure 2:
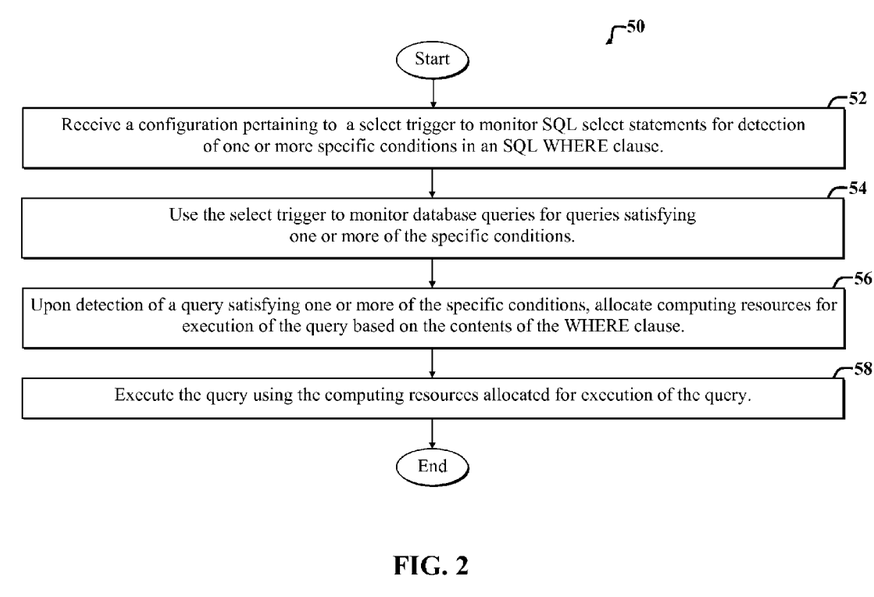
FIG. 2 is a flow diagram of a first example method adapted for use with the system of FIG. 1.

FIG. 2 is a flow diagram of a first example method 50 adapted for use with the system 10 of FIG. 1. In a first step, a select trigger is configured to monitor SQL select statements, such as queries, to detect one or more specific conditions satisfied by a SQL WHERE clause as desired.

A second step 54 includes using select trigger to monitor database queries for queries satisfying one or more of the specific conditions.

In a third step 56, upon detection of a query satisfying one or more of the specific conditions, computing resources are allocated for execution of the query based on the contents of the WHERE clause. For example, the select trigger 22 of FIG. 1 may increase or decrease CPU resources, such as CPU time, I/O prioritization for execution of a SQL query statement based on whether a WHERE clause thereof meets one or more predetermined criteria. Note that the trigger policy 26 is not limited to just criteria from the where clause. It can include additional conditions such as which "named user" is executing the query or DML operation, the time of day the query is executed, etc.

A fourth step 58 includes execution of the query using the computing resources previously allocated therefor.

Figure 3:
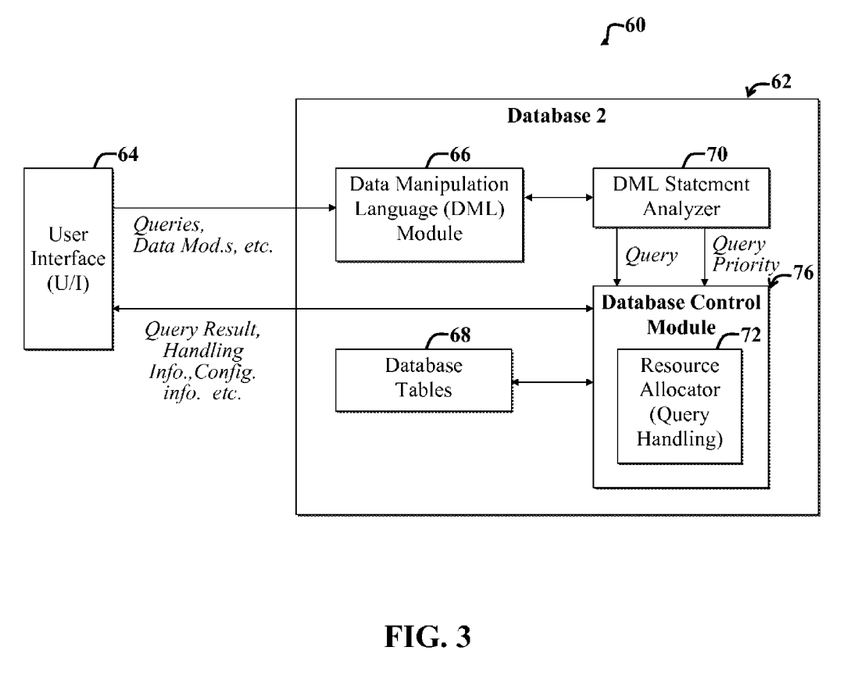
FIG. 3 is a diagram illustrating a second example embodiment of a system for prioritizing and executing Data Manipulation Language (DML) statement accordingly.

FIG. 3 is a diagram illustrating an example embodiment of a second system 60 for prioritizing and executing Data Manipulation Language (DML) statement according to its assigned priority, i.e., prioritization.

The system 60 includes a user interface 64 coupled to a database 62. The database 62 includes a DML module 66 in communication with the user interface 64 and a DML statement analyzer 70. The DML statement analyzer 70 is coupled to a database control module 76, which includes a resource allocator 72 adapted to allocate computing resources for execution of a DML statement. The database control module 76 interfaces the database tables 68 with the user interface 64 via the DML module 66 and the DML statement analyzer 70.

In operation, a user, such as a DataBase Administrator (DBA), may employ a DML, such as SQL, to enter various DML statements, including, but not limited to, queries. The DML module 66 includes instructions for handling and enabling use of DML statements to query and perform I/O operations on the database tables 85.

The user-entered DML statement 70 is analyzed by the DML statement analyzer 70 for predetermined characteristics of the DML statement. The predetermined criteria or conditions with which to compare the predetermined characteristics may be configured by a user via the user interface 64. An example of a DML statement characteristic and corresponding criterion includes a DML statement that includes a statement to write new data to an important table. The importance of the table represents the criterion and may be predetermined by the user. In an example scenario where the DML analyzer 70 determines that the DML statement seeks to write data to a table with an importance score greater than a predetermined threshold, execution of the corresponding DML statement may be assigned a high priority.

The priority value assigned to the DML statement is then used by the resource allocator 72 to ensure that the DML statement is allocated more resources than statements not writing to tables that are as important. Alternatively, or in addition, the execution of the DML statement may be moved ahead in a queue of DML statements waiting to be executed. Note that these examples are merely illustrative, and various types of DML statements and contents may be prioritized based on various criteria. Furthermore, exact details specifying how resources are allocated to a given DML statement based on its assigned priority are application specific and may vary among implementations and applications.

Execution of the DML statement to write to a high priority table may be controlled in accordance with the allocated resources via appropriate computer code or instructions included in the database control module 76. Such details may be programmed by those ordinarily skilled in the art without undue experimentation.

Note that implementations whereby a given DML statement is prioritized via information other than the contents of the DML statement are also possible. For example, the identity of the user may be required to log on to the database 62. Different users may be associated with different priorities, rights, or privileges. For example, a high priority user, such as a corporate president, might cause the DML statement analyzer 70 to default all DML statements entered by the high priority user to high priority. Execution of corresponding DML statements may then be afforded maximum available computing resources for execution of the DML statements.

Figure 4:
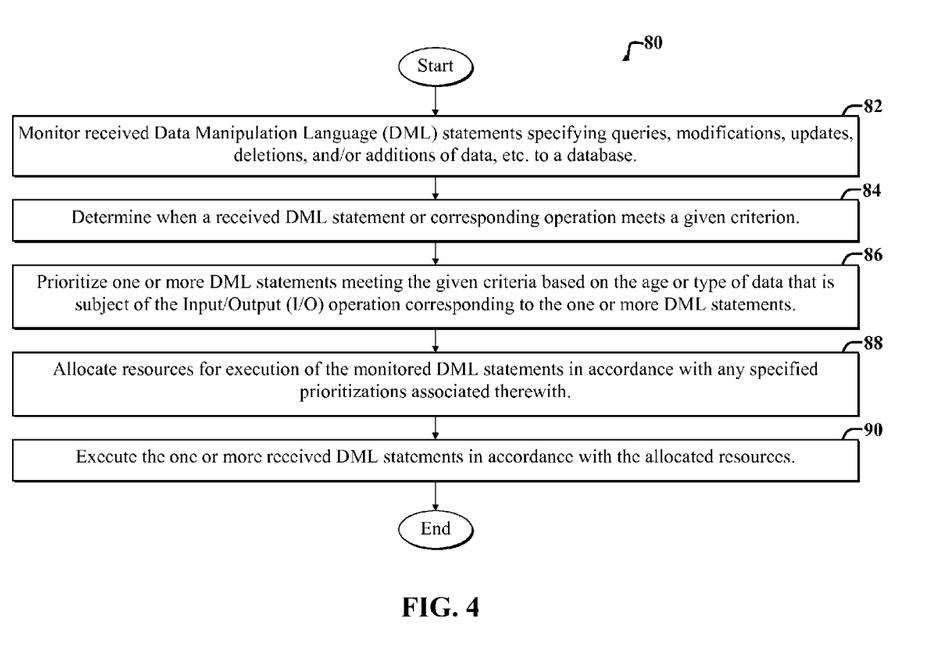
FIG. 4 is a flow diagram of a second example method adapted for use with the systems of FIGS. 1 and 3.

FIG. 4 is a flow diagram of a second example method 80 adapted for use with the systems 10, 60 of FIGS. 1 and 3. An initial monitoring step 82 includes monitoring received DML statements specifying queries, modifications, updates, deletions, and/or additions of data, and so on, to a database.

A subsequent determining step 84 determines when a received DML I/O statement or corresponding operation meets a given criterion. An example criterion includes a condition that data to be accessed by a SQL query statement as specified by the WHERE clause thereof is older or more recent that a predetermined date.

Next, a prioritizing step 86 includes prioritizing one or more DML statements meeting the given criterion or criteria based on the age or type of data that is subject of the I/O operation corresponding to the one or more DML statements. Alternatively, or in addition, an identification of a user that initiated one or more DML statements is used to facilitate prioritization of DML the DML statements. The given criterion is said to include the condition that the user initiating the query statement has been assigned a particular privilege. Prioritization may be realized by assigning a number to a DML statement, where the number is indicative of the relative priority of the DML statement.

In a subsequent allocating step 88, the availability of one or more computing resources or amounts or quantities thereof for execution of the one or more DML statements is/are adjusted in accordance with any specified priority values associated therewith or assigned thereto. Note that resource allocation could involve queuing the one or more DML statements for execution ahead of other statements; assigning a resource group for execution of the one or more DML statements, and so on.

Finally, an executing step 90 includes executing the received DML statements in accordance with the allocated resources.

Figure 5:
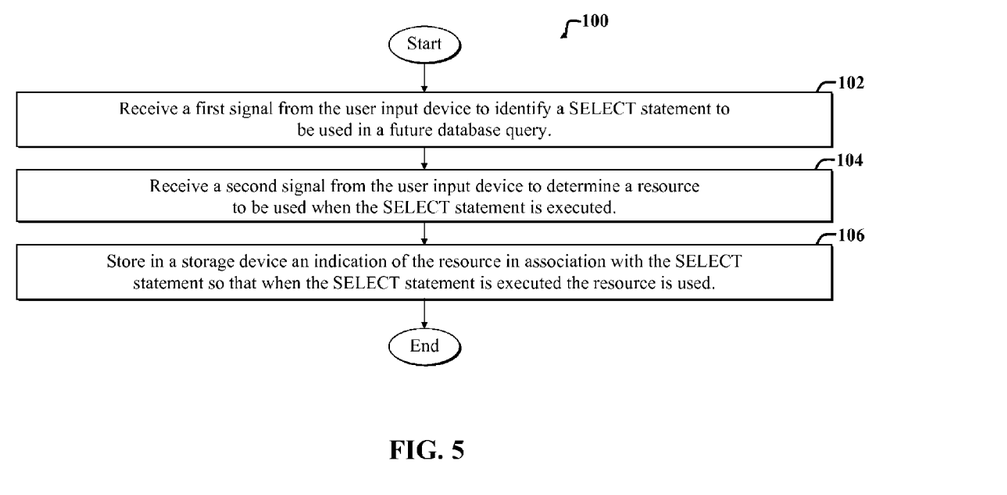
FIG. 5 is a flow diagram of a third example method adapted for use with the systems of FIGS. 1 and 3.

FIG. 5 is a flow diagram of a third example method 100 adapted for use with the systems 10, 60 of FIGS. 1 and 3. The third example method 100 includes a first receiving step 102, which includes receiving a first signal from a user input device, such as represented by the user interface 18 of FIG. 1. The first signal may correspond to trigger configuration information sent from the user interface 18 to the select trigger 22, as shown in FIG. 1. In the present example embodiment, the first signal includes information identifying a SELECT statement or characteristics thereof to be used in a future database query.

A second receiving step 104 includes receiving a second signal from the user input device, where the second signal facilitates determining a resource to be used when the identified SELECT statement is executed. The second signal may also or alternatively facilitate determining how much of a given resource, such as percentage of CPU time within a given time interval, to allocate for execution of the SELECT statement.

The resource may include a rate of processor cycles, amount of processor time, an amount of random access memory, transmission bandwidth, a type of storage media, such as a magnetic disk drive, and so on. Each of these resources may be further classified into identifiable categories. For example, processor cycles may be classified as those cycles use to perform database operations, storage sub-system operations, etc.

Subsequently, a storing step 106 includes storing in a storage device an indication of the resource in association with the SELECT statement so that when the SELECT statement is executed the resource is used. The storage device may correspond, for example, to request for small and large I/O for the select trigger 22 shown in FIG. 1.

The method 100 is illustrative, and more or fewer steps than those shown may be implemented without departing from the scope of the present teachings. For example, the method 100 may further include the step of designating a specific table, e.g., one of the tables 68 of FIG. 3, to be used with the SELECT statement.

The various methods described herein may be adapted to run on various processing systems, such as the first system 10 of FIG. 1 or the system 60 of FIG. 3. A data storage device, such as hard drive, may accommodate storage of data in the databases and/or storage of computer readable instructions for implementing various functionality described herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method executing on a processing system, wherein the processing system is coupled to a user input device and a storage device storing a database, the method comprising:
   determining, using the processing system, whether data specifying information meets a first criterion or a second criterion, with the data specifying information included in a WHERE clause of a SELECT statement, with the data specifying information specifying data in the database that is the subject of the SELECT statement;
   triggering, using the processing system, a first resource group specification if the information included in the WHERE clause meets the first criterion, where the first resource group specification allocates a first set of processing resources of the processing system;
   triggering, using the processing system, a second resource group specification if the information included in the WHERE clause meets the second criterion, where the second resource group specification allocates a second set of processing resources of the processing system; and
   processing, using the processing system, the SELECT statement using either the first set of processing resources or the second set of processing resources based on which resource group specification is triggered.

2. The method of claim 1 wherein the processing resources further include a rate of processor cycles.

3. The method of claim 2 wherein the rate of processor cycles includes cycles executed for database operations.

4. The method of claim 2 wherein the rate of processor cycles includes cycles executed for storage sub-system operations.

5. The method of claim 1 wherein the processing resources further include an amount of processor time.

6. The method of claim 1 wherein the processing resources further include includes a magnetic disk drive.

7. The method of claim 1 wherein the processing resources further include CPU processing time in an intelligent storage sub-system.

8. The method of claim 1 wherein the processing resources further include transmission bandwidth.

9. The method of claim 1 further comprising:
   designating a TABLE to be used with the SELECT statement.

10. An apparatus comprising:
    a processor;
    a non-transitory computer readable storage device coupled to the processor, wherein the non-transitory computer readable storage device includes a database and instructions executable by the processor for:
    determining whether data specifying information meets a first criterion or a second criterion, with the data specifying information included in a WHERE clause of a SELECT statement, with the data specifying information specifying data in the database that is the subject of the SELECT statement;
    triggering a first resource group specification if the information included in the WHERE clause meets the first criterion, where the first resource group specification allocates a first set of processing resources of the processing system;
    triggering a second resource group specification if the information included in the WHERE clause meets the second criterion, where the second resource group specification allocates a second set of processing resources of the processing system; and
    processing the SELECT statement using either the first set of processing resources or the second set of processing resources based on which resource group specification is triggered.

11. The apparatus as recited in claim 10 wherein the first resource group specification allocates a subset of resources from a plurality of resources and further includes:
    allocating the subset based upon a determination that data which is the subject of the SELECT statement was stored before a predetermined date.

12. The apparatus as recited in claim 10 wherein the first resource group specification allocates a subset of resources from a plurality of resources and further includes:
    allocating the subset based upon a time interval between the data being read from the storage device and receipt of the SELECT statement.

13. The apparatus as recited in claim 10 wherein the first resource group specification allocates a subset of resources from a plurality of resources and further includes:
    allocating the subset based an identification of a user that initiates a database query.

14. A non-transitory computer-readable medium having stored thereon in a fixed tangible form instructions when executed by the processor to cause the processor to carry-out steps:
    determining whether data specifying information meets a first criterion or a second criterion, with the data specifying information included in a WHERE clause of a SELECT statement, with the data specifying information specifying data in the database that is the subject of the SELECT statement;
    triggering a first resource group specification if the information included in the WHERE clause meets the first criterion, where the first resource group specification allocates a first set of processing resources of the processing system;
    triggering a second resource group specification if the information included in the WHERE clause meets the second criterion, where the second resource group specification allocates a second set of processing resources of the processing system; and
    processing the SELECT statement using either the first set of processing resources or the second set of processing resources based on which resource group specification is triggered.

15. The non-transitory computer-readable medium as recited in claim 14 wherein the first resource group allocates a resource based upon a time interval between an I/O access of the data, a database query and an identification of a user that initiates the database query.

16. The method as recited in claim 1 wherein the first resource group specification allocates a subset of resources from a plurality of resources and further includes:
    allocating the subset based upon a determination that data which is the subject of the SELECT statement was stored before a predetermined date.

17. The method as recited in claim 1 wherein the first resource group specification allocates a subset of resources from a plurality of resources and further includes:
    allocating the subset based upon a time interval between the data being read from the storage device and receipt of the SELECT statement.

18. The method as recited in claim 1 wherein the first resource group specification allocates a subset of resources from a plurality of resources and further includes:
    allocating the subset based an identification of a user that initiates a database query.

* * * * *